(12) United States Patent
Li et al.

(10) Patent No.: US 12,061,611 B2
(45) Date of Patent: Aug. 13, 2024

(54) SEARCH METHOD, APPARATUS, ELECTRONIC DEVICE, STORAGE MEDIUM AND PROGRAM PRODUCT

(71) Applicant: Beijing Baidu Netcom Science Technology Co., Ltd., Beijing (CN)

(72) Inventors: Mengze Li, Beijing (CN); Shichen Shao, Beijing (CN); Yongheng Li, Beijing (CN); Yifei Yue, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 32 days.

(21) Appl. No.: 17/847,051

(22) Filed: Jun. 22, 2022

(65) Prior Publication Data
US 2022/0318253 A1    Oct. 6, 2022

(30) Foreign Application Priority Data

Jun. 28, 2021  (CN) .......................... 202110718627.0

(51) Int. Cl.
*G06F 16/2457* (2019.01)
*G06F 16/28* (2019.01)
*G06N 20/00* (2019.01)

(52) U.S. Cl.
CPC .. *G06F 16/24573* (2019.01); *G06F 16/24578* (2019.01); *G06F 16/285* (2019.01); *G06N 20/00* (2019.01)

(58) Field of Classification Search
CPC ............. G06F 16/24573; G06F 16/285; G06F 16/24578; G06N 20/00
USPC ....................................................... 707/769
See application file for complete search history.

(56) References Cited

U.S. PATENT DOCUMENTS

| 2008/0154798 A1* | 6/2008 | Valz ..................... G06F 16/9535 707/E17.014 |
| 2016/0026713 A1* | 1/2016 | Katic ...................... G06F 16/28 707/723 |
| 2017/0085929 A1* | 3/2017 | Arpteg .................. G06N 20/00 |

(Continued)

FOREIGN PATENT DOCUMENTS

| CN | 102317943 A | 1/2012 |
| CN | 109815379 A | 5/2019 |
| CN | 110263262 A | 9/2019 |

OTHER PUBLICATIONS

English Machine Translation of CN110263262A. (18 Pages).
English Machine Translation of CN102317943A. (19 Pages).
English Machine Translation of CN109815379A. (15 Pages).

*Primary Examiner* — Hosain T Alam
*Assistant Examiner* — Saba Ahmed
(74) *Attorney, Agent, or Firm* — Maginot, Moore & Beck LLP

(57) ABSTRACT

The disclosure provides a search method and apparatus, an electronic device, a storage medium, and a program product. The disclosure relates to the field of Internet technology, and in particular to the field of intelligent search technology. The method includes: obtaining search information; outputting information of a target media object, wherein, search key information of the target media object matches the search information, and the search key information of the target media object matches category key information of a target category, and the target media object belongs in the target category.

13 Claims, 2 Drawing Sheets

(56) References Cited

U.S. PATENT DOCUMENTS

2021/0406548 A1* 12/2021 Zhang .................... G06V 20/40
2022/0092881 A1* 3/2022 Huang ................. G06V 10/762

* cited by examiner

SEARCH METHOD, APPARATUS, ELECTRONIC DEVICE, STORAGE MEDIUM AND PROGRAM PRODUCT

CROSS-REFERENCE TO RELATED APPLICATION

The present application claims priority to the Chinese patent application No. 202110718627.0 filed in China on Jun. 28, 2021, the disclosure of which is incorporated herein by reference in its entirety.

TECHNICAL FIELD

The present disclosure relates to the field of Internet technology, in particular to the field of intelligent search technology.

BACKGROUND

With the development of Internet technology, the application of intelligent search is becoming more and more widespread. At present, the main technical means of intelligent search technology is to directly match the search information entered by the user against the content of media objects in a media library to obtain search results.

SUMMARY

The present disclosure provides a search method and apparatus, an electronic device, a storage medium, and a program product.

According to an aspect of the present disclosure, a search method is provided, including:

obtaining search information;

outputting information of a target media object, wherein search key information of the target media object matches the search information, and the search key information of the target media object matches category key information of a target category, and the target media object belongs in the target category.

According to another aspect of the present disclosure, a search apparatus is provided, including:

an obtaining module, configured to obtain search information;

an output module, configured to output information of a target media object, wherein search key information of the target media object matches the search information, and the search key information of the target media object matches category key information of a target category, and the target media object belongs in the target category.

According to another aspect of the present disclosure, an electronic device is provided, including:

at least one processor; and a memory communicatively connected to the at least one processor;

wherein the memory stores therein an instruction configured to be executed by the at least one processor, and the at least one processor is configured to execute the instruction, to implement the search method provided in the present disclosure.

According to another aspect of the present disclosure, a non-transitory computer readable storage medium storing therein a computer instruction is provided, wherein the computer instruction is configured to be executed by a computer, to implement the search method provided in the present disclosure.

According to another aspect of the present disclosure, a computer program product including a computer program is provided, wherein the computer program is configured to be executed by a processor, to implement the search method provided in the present disclosure.

It is understood, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The drawings are used to facilitate a better understanding of this disclosure, and do not constitute a limitation on the present disclosure.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

Figure 1:
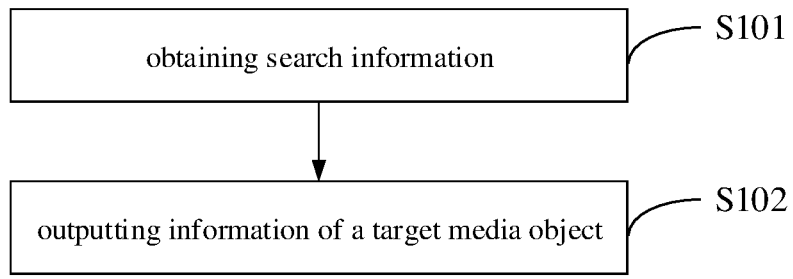
FIG. 1 is a flowchart of a search method according to the present disclosure.

FIG. 1 is a flowchart of a search method according to the present disclosure. As shown in FIG. 1, the method includes a step S101 and a step S102.

Step S101: obtaining search information.

The search information may be search information sent by an electronic device, or may be search information input by a user. In addition, the search information may include, but is not limited to, text, voice, and image.

Step S102: outputting information of a target media object, wherein the search key information of the target media object matches the search information, and the search key information of the target media object matches the category key information of a target category, and the target media object belongs in the target category.

The target media object may be a media object in a content library whose search key information matches the search information, and the content library may be a local or remote content library, and the content library includes a large number of media objects.

In this disclosure, media content includes, but is not limited to, documents, videos, webpages or voices.

The search key information of the target media object may be key information extracted in advance from the target media object. That the search key information matches the search information may refer to that the similarity between the search key information and the search information is greater than a preset threshold, or the search key information is associated with the search information.

That the search key information matches the category key information of the target category may refer to that the similarity between the search key information and the category key information is greater than a preset threshold, or the search key information is associated with the category key information. In the present disclosure, the category key information of each category can be obtained in advance.

The outputting information of the target media object may be: determining the search key information that matches the search information, determining the target media object, and then outputting the information of the target media object. Or, in some embodiments, after determining the search key information that matches the search information, all or a part of the search key information of the target media object may be directly output.

In addition, the outputting may be: displaying the information of the target media object, or sending the information of the target media object to the electronic device, or playing the information of the target media object.

In this disclosure, since the search key information of the target media object matches the search information, and the search key information of the target media object matches the category key information of the target category, the search key information of the media object is more accurate, which can improve the accuracy of the search.

The search method provided in the present disclosure may be applied to electronic devices, e.g., a server, a computer, a mobile phone, a tablet computer, and other electronic devices.

As an optional implementation, the search key information of the target media object is obtained in the following manner by performing a similarity comparison between first key information of the target media object and the category key information, to obtain second key information, wherein the second key information is the key information in the first key information whose similarity with the category key information satisfies a first preset condition, and by extracting the search key information from the second key information and producer characteristic information of the target media object. The first key information of the target media object may be key information extracted from at least one of content or title of the target media object.

The performing the similarity comparison between first key information of the target media object and the category key information may be: calculating similarities, such as cosine similarities, between word vectors of each keyword in the first key information and word vectors of each keyword in the category key information. The word vector may be a word frequency vector, that is, the vector includes a weighted frequency in which the keyword appears. For example, keywords are extracted by using a TF-IDF (term frequency-inverse document frequency) algorithm, the word frequency of each keyword in its constituent part is counted, and the word frequency vector is generated.

In the first key information, the key information whose similarity with the category key information satisfies the first preset condition may be: a keyword in the first key information whose similarity with the category key information is higher than a preset threshold. In addition, the keyword in the second key information may also satisfy a preset word frequency condition, for example, the word frequency of the keyword in the first key information is higher than a preset threshold, or the keyword is among the top n when ranked in descending order of word frequency.

The producer characteristic information may be characteristic information of the author, client or electronic device that publishes or reports the target media content. For example, the producer characteristic information includes at least one of the following:

the producer's authentication domain, self-selected category, the domain profile of the user who follows, browses and purchases the target media content, the domain profile of the user who browses the target media content, etc.

Further, the producer characteristic information may be a producer characteristic weight, for example, a weight set for at least one of the foregoing characteristic information, and finally a characteristic set of producer dimension is obtained.

In this implementation, since the execution key information is extracted from the second key information and the producer characteristic information, and the similarity between the second key information and the category key information satisfies the first preset condition, the accuracy of the search key information of the media object can be improved. In addition, due to the addition of producer characteristic information, it is possible to obtain the search key information that includes a key information that has the best and highest word frequency in the first key information as well as the producer characteristics, so as to ensure that the extracted key search information matches the subject of the media content itself and user-oriented behavior, and the accuracy of key information extraction is further improved, and the dimensions of the matching in the search process can be made more comprehensive, thereby improving the search effect.

It should be noted that the present disclosure is not limited to the foregoing manner of obtaining the search key information. For example, in some implementations, producer characteristic information may not be added.

In some implementations, the category key information of each category can be extracted in advance. For example, taking the media object being a document for example, a batch of library documents in each category can be extracted in an early stage for keyword mining, to create a basic lexicon set. For example, extracting a total of 1 million documents within 10 categories. The documents can be selected according to presentation volume (PV) and purchase volume. High-frequency words in each category are mined, and then filtered manually or intelligently to build a basic library category lexicon. The lexicon includes the category key information of each category. In addition, the category key information of new uploaded content can be regularly extracted, to update and maintain the basic library category lexicon in a timely manner.

Optionally, the first key information of the target media object is obtained by performing key information extraction on at least one of content or title of the target media object to obtain a plurality of key information, and by calculating the similarity between the plurality of key information to obtain the first key information, wherein the first key information is the key information in the plurality of key information whose similarity satisfies a second preset condition.

The performing key information extraction on at least one of content or title of the target media object may be: dividing, based on a basic semantic comprehension algorithm, the content and title of the target media object into a set of content segments, obtaining characteristic word groups, and extracting key information from the characteristic word groups.

Further, it is possible to analyze and remove meaningless content from the segment content, to improve the accuracy of key information extraction. For example, remove the interfering content of the segment content, such as "spaces"

in Chinese sentences, to ensure that similar contents of different versions can be matched.

In addition, the extraction of key information from the characteristic word groups may be: counting the word frequency of each characteristic word in the constituent part, and extracting the word group in the characteristic word groups that is specifically targeted and whose word frequency is higher than a certain threshold. The word group that is specifically targeted may be a word group with a distinctive feature, such as a word group with a small amount of information or an unequivocal meaning. In this way, the accuracy of key information can be further improved due to the extraction of word group that is specifically targeted and whose word frequency is higher than a certain threshold.

The similarity between the multiple key information may be the similarity between the word vectors of the key information, such as the similarity between the word frequency vectors.

In the plurality of key information, the key information whose similarity satisfies the second preset condition may be a pair of key information whose similarity is higher than a preset threshold.

In this implementation, since the key information whose similarity meets the second preset condition is extracted, the extracted key information more accurately reflects the content of the media object, so as to improve the accuracy of key information extraction.

It should be noted that the present disclosure is not limited to the foregoing manner of obtaining the first key information of the target media object. For example, in some implementations, the key information of the media object can be extracted directly based on a key feature extraction algorithm.

Optionally, the search key information includes a structured field, and the extracting the search key information from the second key information and the producer characteristic information of the target media object includes:

extracting the structured field from the second key information and the producer characteristic information by using a machine learning model, wherein the machine learning model is a pre-obtained model used for extracting the structured field of the media object of the target category.

The machine learning model may be pre-trained or pre-configured by other electronic devices.

The present disclosure can obtain the machine learning model of each category in advance, to extract the structured field of each media object of each category. For example, the production data extraction templates that meet the actual situation of each category can be manually prepared in advance. For example, for journal articles, fields such as journal title, period, start publication date and ISSN need to be extracted, and for basic education documents, fields such as grade and subject need to be extracted. For the structured fields of different categories, the machine learning model is pre-trained to extract the corresponding structured fields. In some implementations, the machine learning model can also be used for extraction of structured fields of multiple categories including the target category. For example, one machine learning model can be used for extraction of structured fields of media content in all categories.

In addition, usability verification and repeatability verification can also be performed on the machine learning model. Usability verification and repeatability verification can include manual evaluation and machine algorithm verification, so that the machine learning model can be more accurate, to achieve accurate extraction and storage of various information fields in different categories.

In this implementation, since the structured fields are extracted from the second key information and the producer characteristic information by using a machine learning model, the search information can be matched with the structured fields during search, so that the search results are more matched to improve the search effect.

It should be noted that this disclosure is not limited to the search key information including a structured field. For example, in some implementations, the search key information may also be an unstructured field.

Optionally, the outputting information of the target media object includes:

determining, based on pre-established association knowledge graph of keywords and structured fields, a target structured field that matches the keyword in the search information, and outputting information of the target media object, wherein the target media object is the media object corresponding to the target structured field.

The association knowledge graph of keywords and structured fields may include the correlation between multiple keywords and multiple structured fields. For example, match the stored structured fields of multiple media objects against the keyword set searched by the user one by one, calculate the matching degree or similarity, and then associate keywords and structured fields whose matching degree or similarity is higher than a preset threshold.

In the above implementation, since the search is performed based on the association knowledge graph, the efficiency of the search can be improved, and the accuracy of the search can also be improved.

In some implementations, the outputting information of the target media object may include: outputting structured information of the target media object.

The structured information of the target media object may include a part or all of information in the structured field of the target media object, or may be structured information defined separately for the output of the search.

In this implementation, due to the output of the structured information of the target media object, the presentation effect of the search results can be improved, so that the user can more intuitively understand the key information of the searched media object. For example, if a user searches for a certain industry trend, it can directly show the user the industry trend chart extracted from the documents in the research report category.

In some implementations, the association knowledge graph may be dynamically adjusted based on the parameters of the structured information of the media object. The parameters of the structured information may include at least one of the following:

recall rate, click-through rate, media object user data, wherein the media object user data can include information such as downloads, purchases, favorites, and comments.

Specifically, the association knowledge graph can be dynamically adjusted based on the weighted calculation of the parameters of the structured information and manual random inspection and scoring. Due to the dynamic adjustment of the association knowledge graph, the accuracy of the association knowledge graph can be improved, and thus the accuracy of search can be improved.

As an optional implementation, the target media object is determined to belong in the target category based on a classification model, and the classification model is a model that is dynamically adjusted based on classification accuracy and parameter information of media object, and the parameter information includes at least one of the following: click-through rate or a number of times the media object is presented.

The classification model may be implemented through classifying the target media objects by using a neighbor algorithm. For example, using the k-nearest neighbor algorithm, find the k neighboring media objects closest to the target media object in the training dataset, and determine the candidate category score of the target media object based on the category of these neighboring media objects. Each candidate category score is equal to the weight corresponding to the similarity between the neighboring media object in the category and the target media object. If some media objects in the k neighboring media objects belong in the same category, then the weights of neighboring media objects in the category are summed and used as the similarity between the category and the target media object. Finally, the category with the highest similarity is retained as the final category of the target media object. The media objects in the training dataset may be a media object set obtained by manually classifying a batch of media objects.

The model that can be dynamically adjusted based on classification accuracy and parameter information of media objects may be a classification model adjusted according to a score calculated based on classification accuracy and parameter information of media objects. Specifically, a classification effect score of the classification model may be calculated based on the classification accuracy counted in a certain time unit and the parameter information of the media objects. When the classification effect score meets expectations, the classification model is not to be adjusted, and when it does not meet expectations, the classification model needs to be adjusted. For example, after adding the category labels to the media objects, the classification effect F(e) of each media object can be calculated at the monthly level, where F(e) can be expressed as follows:

$$F(e)=f(a,b)$$

wherein, a denotes classification accuracy, which can be specifically obtained by manually extracting and evaluating the classification results. The a may have a score of very accurate (2 points), relatively accurate (1 point), or irrelevant (0 points);

b is the parameter information of the media object, which can be specifically used for indicating changes of the media object's click-through rate and the number of times the media object is presented. In actual applications, the category label is a key field for distribution. The more accurate the classification, the more likely the media object is to be presented to suitable users, and the higher the click-through rate and the number of times the media object is presented. Therefore, different scores can be set according to the rate of change of the click-through rate and the number of times the media object is presented relative to those before the classification, to evaluate the effect of the classification model.

The f( ) is a function preset according to requirements of actual scenes, which is not specifically limited. For example, it may be a+b, or a multiplied by b, etc.

The model that can be dynamically adjusted based on the classification accuracy and the parameter information of the media object may be implemented through adjusting the weights in the classification model based on the classification accuracy and the parameter information of the media object. The initial weight of the classification model can be cold start data, and then, based on the classification accuracy and the parameter information of the media object, the classification model can be continuously optimized through manual evaluation and online effect evaluation.

In this embodiment, since the classification model is a model that is dynamically adjusted based on the classification accuracy and the parameter information of the media object, the classification accuracy of the classification model can be improved.

In the present disclosure, since the search key information of the target media object matches the search information, and the search key information of the target media object matches the category key information of the target category, the accuracy of the search can be improved.

Figure 2:
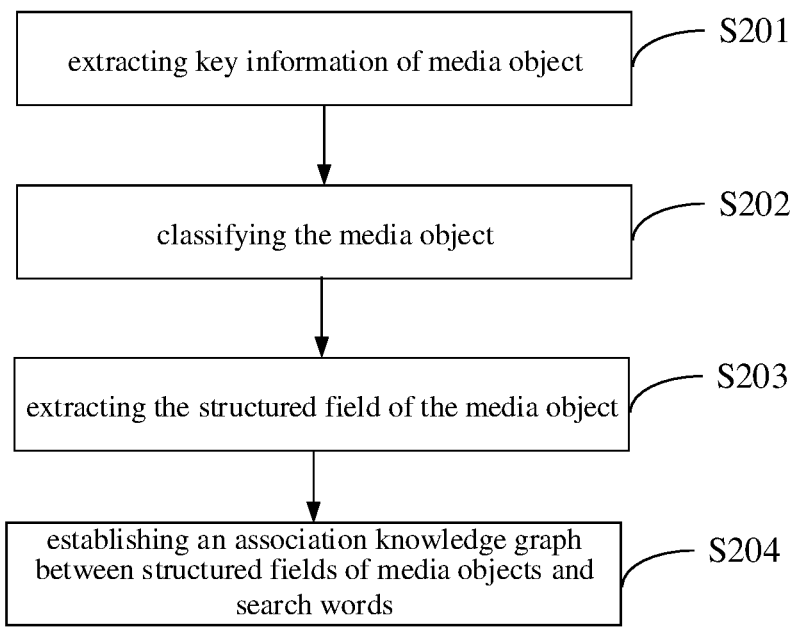
FIG. 2 is a flowchart of a method for establishing a knowledge graph according to the present disclosure.

FIG. 2 is a flow chart of a method for establishing a knowledge graph according to the present disclosure. As shown in FIG. 2, the method includes a step S201, a step S202, a step S203 and a step S204.

Step S201: extracting key information of the media object.

For the extraction of key information of the media object, reference can be made to the foregoing extraction of key information of the target media object, which will not be repeated here.

Step S202: classifying the media object.

For the classification of the media object, reference can be made to the foregoing classification of the target media objects, which will not be repeated here.

Step S203: extracting the structured field of the media object.

For the extraction of the structured field of the media object, reference can be made to the foregoing extraction of the structured field of the target media object, which will not be repeated here.

Step S204: establishing an association knowledge graph between structured fields of media objects and search words.

For the association knowledge graph, reference can be made to the foregoing association knowledge graph, which will not be repeated here. The search words may be pre-obtained search words, such as past search words of a user.

Figure 3:
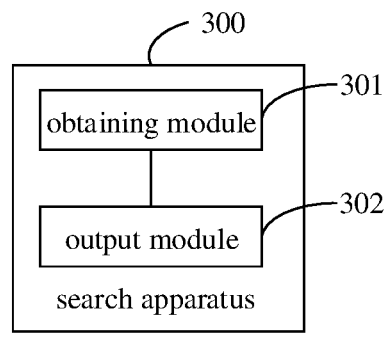
FIG. 3 is a structural diagram of a search apparatus according to the present disclosure.

FIG. 3 illustrates a search apparatus according to the present disclosure. As shown in FIG. 3, the search apparatus 300 includes:

an obtaining module 301, configured to obtain search information;

an output module 302, configured to output information of a target media object, wherein the search key information of the target media object matches the search information, and the search key information of the target media object matches the category key information of a target category, and the target media object belongs in the target category.

Optionally, the search key information of the target media object is obtained in the following manner:

performing a similarity comparison between the first key information of the target media object and the category key information to obtain second key information, where the second key information is key information in the first key information whose similarity with the category key information satisfies a first preset condition;

extracting the search key information from the second key information and the producer characteristic information of the target media object.

Optionally, the first key information of the target media object is obtained in the following manner:

performing key information extraction on at least one of content or title of the target media object to obtain a plurality of key information;

calculating the similarity between the plurality of key information to obtain the first key information, wherein the first key information is the key information in the plurality of key information whose similarity satisfies the second preset condition.

Optionally, the search key information includes a structured field, and the extraction of the search key information from the second key information and the producer characteristic information of the target media object includes:

extracting the structured field from the second key information and the producer characteristic information by using a machine learning model, wherein the machine learning model is a pre-obtained model used for extracting the structured field of the media object of the target category.

Optionally, the output module 302 is configured to determine the target structured fields matching the keywords in the search information based on the pre-established association knowledge graph between keywords and structured fields, and output structured information of the target media object, wherein the target media object is a media object corresponding to the target structured field.

Optionally, the target media object is determined, based on a classification model, to belong in the target category, and the classification model is a model that is dynamically adjusted based on classification accuracy and parameter information of the media object, and the parameter information includes at least one of the following: click-through rate or a number of times the media object is presented.

It should be noted here that the search apparatus provided in the present disclosure can realize all the method steps implemented by the method embodiment and can achieve the same technical effects. The parts and beneficial effects that are the same as those in the method embodiment will not be described again.

According to embodiments of the present disclosure, an electronic device, a readable storage medium and a computer program product are further provided.

Figure 4:
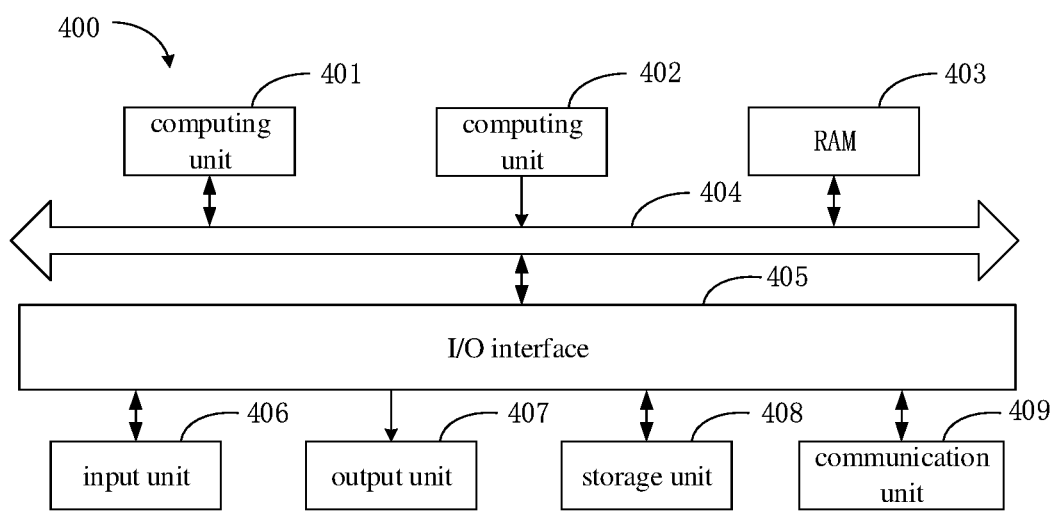
FIG. 4 is a block diagram of an electronic device in which a search method according to an embodiment of the present disclosure may be implemented.

FIG. 4 is a schematic block diagram of an exemplary electronic device 400 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 4, the device 400 includes a computing unit 401, which may carry out various suitable actions and processes according to a computer program stored in a read-only memory (ROM) 402 or a computer program loaded from a storage unit 408 into a random access memory (RAM) 403. The RAM 403 may as well store therein all kinds of programs and data required for the operation of the device 400. The computing unit 401, the ROM 402 and the RAM 403 are connected to each other through a bus 404. An input/output (I/O) interface 405 is also connected to the bus 404.

Multiple components in the device 400 are connected to the I/O interface 405. The multiple components include: an input unit 406, e.g., a keyboard, a mouse and the like; an output unit 407, e.g., a variety of displays, loudspeakers, and the like; a storage unit 408, e.g., a magnetic disk, an optic disc and the like; and a communication unit 409, e.g., a network card, a modem, a wireless transceiver, and the like.

The communication unit 409 allows the device 400 to exchange information/data with other devices through a computer network and/or other telecommunication networks, such as the Internet.

The computing unit 401 may be any general purpose and/or special purpose processing components having a processing and computing capability. Some examples of the computing unit 401 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 401 carries out the aforementioned methods and processes, e.g., the search method. For example, in some embodiments, the search method may be implemented as a computer software program tangibly embodied in a machine readable medium such as the storage unit 408. In some embodiments, all or a part of the computer program may be loaded and/or installed on the device 400 through the ROM 402 and/or the communication unit 409. When the computer program is loaded into the RAM 403 and executed by the computing unit 401, one or more steps of the search method may be implemented. Optionally, in other embodiments, the computing unit 401 may be configured in any other suitable manner (e.g., by means of a firmware) to implement the search method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), a computer hardware, a firmware, a software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such backend, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server can be a cloud server, a server of a distributed system, or a server combined with a blockchain.

It is appreciated, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A search method, performed by an electronic device, comprising:
   obtaining search information;
   outputting information of a target media object, wherein search key information of the target media object matches the search information, and the search key information of the target media object matches category key information of a target category, and the target media object belongs in the target category;
   wherein the search method further comprises obtaining the search key information of the target media object by:
   performing a similarity comparison between first key information of the target media object and the category key information, to obtain second key information, wherein the second key information is key information in the first key information having similarity with the category key information that satisfies a first preset condition; and
   extracting the search key information from the second key information and producer characteristic information of the target media object;
   wherein the target media object is determined, based on a classification model, to belong in the target category, and the classification model is a model that is dynamically adjusted based on classification accuracy and parameter information of a media object, and the parameter information comprises at least one of:
   a click-through rate or a number of times the media object is presented;
   wherein the target media object is a document; and
   the category key information of each category is comprised in a basic library category lexicon, and the basic library category lexicon is built by: extracting a batch of library documents in each category for keyword mining, mining high-frequency words in each category, and then filtering the high-frequency words manually or intelligently.

2. The search method according to claim 1, further comprising obtaining the first key information of the target media object by:
   performing key information extraction on at least one of content or title of the target media object, to obtain a plurality of key information; and
   calculating a similarity between the plurality of key information, to obtain the first key information, wherein the first key information is key information in the plurality of key information having similarity that satisfies a second preset condition.

3. The search method according to claim 1, wherein the search key information comprises a structured field, and extracting the search key information from the second key information and the producer characteristic information of the target media object comprises:
   extracting the structured field from the second key information and the producer characteristic information using a machine learning model, wherein the machine learning model is a pre-obtained model used for extracting the structured field of a media object of the target category.

4. The search method according to claim 3, wherein outputting the information of the target media object comprises:
   determining a target structured field that matches a keyword in the search information based on a pre-established association knowledge graph between keywords and structured fields, and outputting the information of the target media object, wherein the target media object is the media object corresponding to the target structured field.

5. An electronic device, comprising:
at least one processor; and
a memory communicatively connected to the at least one processor,
wherein the memory stores therein instructions configured to be executed by the at least one processor, and the at least one processor is configured to execute the instructions, to implement a search method, comprising:
obtaining search information;
outputting information of a target media object, wherein search key information of the target media object matches the search information, and the search key information of the target media object matches category key information of a target category, and the target media object belongs in the target category;
wherein the search method further comprises obtaining the search key information of the target media object by:
performing a similarity comparison between first key information of the target media object and the category key information, to obtain second key information, wherein the second key information is key information in the first key information having similarity with the category key information that satisfies a first preset condition; and
extracting the search key information from the second key information and producer characteristic information of the target media object;
wherein the target media object is determined, based on a classification model, to belong in the target category, and the classification model is a model that is dynamically adjusted based on classification accuracy and parameter information of a media object, and the parameter information comprises at least one of:
a click-through rate or a number of times the media object is presented;
wherein the target media object is a document; and
the category key information of each category is comprised in a basic library category lexicon, and the basic library category lexicon is built by: extracting a batch of library documents in each category for keyword mining, mining high-frequency words in each category, and then filtering the high-frequency words manually or intelligently.

6. The electronic device according to claim 5, wherein the search method further comprises obtaining the first key information of the target media by:
performing key information extraction on at least one of content or title of the target media object, to obtain a plurality of key information; and
calculating a similarity between the plurality of key information, to obtain the first key information, wherein the first key information is key information in the plurality of key information having similarity that satisfies a second preset condition.

7. The electronic device according to claim 5, wherein the search key information comprises a structured field, and extracting the search key information from the second key information and the producer characteristic information of the target media object comprises:
extracting the structured field from the second key information and the producer characteristic information using a machine learning model, wherein the machine learning model is a pre-obtained model used for extracting the structured field of a media object of the target category.

8. The electronic device according to claim 7, wherein outputting the information of the target media object comprises:
determining a target structured field that matches a keyword in the search information based on a pre-established association knowledge graph between keywords and structured fields, and outputting the information of the target media object, wherein the target media object is the media object corresponding to the target structured field.

9. A non-transitory computer readable storage medium, storing therein a computer instruction, wherein the computer instruction is configured to be executed by a computer, to implement a search method, comprising:
obtaining search information;
outputting information of a target media object, wherein search key information of the target media object matches the search information, and the search key information of the target media object matches category key information of a target category, and the target media object belongs in the target category;
wherein the search method further comprises obtaining the search key information of the target media object by:
performing a similarity comparison between first key information of the target media object and the category key information, to obtain second key information, wherein the second key information is key information in the first key information having similarity with the category key information that satisfies a first preset condition; and
extracting the search key information from the second key information and producer characteristic information of the target media object;
wherein the target media object is determined, based on a classification model, to belong in the target category, and the classification model is a model that is dynamically adjusted based on classification accuracy and parameter information of a media object, and the parameter information comprises at least one of:
a click-through rate or a number of times the media object is presented;
wherein the target media object is a document; and
the category key information of each category is comprised in a basic library category lexicon, and the basic library category lexicon is built by: extracting a batch of library documents in each category for keyword mining, mining high-frequency words in each category, and then filtering the high-frequency words manually or intelligently.

10. The non-transitory computer readable storage medium according to claim 9, wherein the search method further comprises obtaining the first key information of the target media object by:
performing key information extraction on at least one of content or title of the target media object, to obtain a plurality of key information; and
calculating a similarity between the plurality of key information, to obtain the first key information, wherein the first key information is key information in the plurality of key information having similarity that satisfies a second preset condition.

11. The non-transitory computer readable storage medium according to claim 9, wherein the search key information comprises a structured field, and extracting the search key information from the second key information and the producer characteristic information of the target media object comprises:
    extracting the structured field from the second key information and the producer characteristic information using a machine learning model, wherein the machine learning model is a pre-obtained model used for extracting the structured field of a media object of the target category.

12. The non-transitory computer readable storage medium according to claim 11, wherein outputting the information of the target media object comprises:
    determining a target structured field that matches a keyword in the search information based on a pre-established association knowledge graph between keywords and structured fields, and outputting the information of the target media object, wherein the target media object is the media object corresponding to the target structured field.

13. A computer program product, comprising a computer program, wherein the computer program is configured to be executed by a processor, to implement the method according to claim 1.

\* \* \* \* \*